US012579453B2

(12) United States Patent
Wang et al.

(10) Patent No.: US 12,579,453 B2
(45) Date of Patent: Mar. 17, 2026

(54) SAFETY INTERLOCK FAILURE PREDICTION METHOD AND ROLL PRODUCTION SYSTEM

(71) Applicant: Zhangjiakou Cigarette Factory Co., Ltd., Zhangjiakou (CN)

(72) Inventors: Wei Wang, Zhangjiakou (CN); Jin Wang, Zhangjiakou (CN); Duanduan Li, Zhangjiakou (CN); Fang Liu, Zhangjiakou (CN); Weichen Zhang, Zhangjiakou (CN); Jing Li, Zhangjiakou (CN); Chao Kong, Zhangjiakou (CN); Xin Zhao, Zhangjiakou (CN)

(73) Assignee: Zhangjiakou Cigarette Factory Co., Ltd., Zhangjiakou (CN)

( * ) Notice: Subject to any disclaimer, the term of this patent is extended or adjusted under 35 U.S.C. 154(b) by 909 days.

(21) Appl. No.: 17/869,829

(22) Filed: Jul. 21, 2022

(65) Prior Publication Data

US 2024/0028926 A1  Jan. 25, 2024

(51) Int. Cl.
*G06N 5/04* (2023.01)
*G06N 5/02* (2023.01)
*G06N 5/022* (2023.01)

(52) U.S. Cl.
CPC .............. *G06N 5/04* (2013.01); *G06N 5/022* (2013.01)

(58) Field of Classification Search
CPC .......... G06N 5/04; G06N 5/022; G06N 20/10; B65B 57/18
See application file for complete search history.

(56) References Cited

U.S. PATENT DOCUMENTS

| | | | |
|---|---|---|---|
| 5,870,317 A * | 2/1999 | Barnett | .............. G05B 23/0256 307/115 |
| 2020/0106481 A1 | 4/2020 | Mitchell et al. | |
| 2022/0125098 A1* | 4/2022 | Daniek | ................... A24C 1/02 |

FOREIGN PATENT DOCUMENTS

| | | |
|---|---|---|
| CN | 103577700 A | 2/2014 |
| CN | 203740223 U | 7/2014 |
| CN | 109779938 A | 5/2019 |

(Continued)

OTHER PUBLICATIONS

English Translation of "CN-209928590-U" (Year: 2020).*

*Primary Examiner* — Charles R Kasenge

(57) ABSTRACT

The present disclosure provides a method for predicting safety interlock failure and a system for producing a roll package. The method for predicting safety interlock failure includes: obtaining, by a model for predicting safety interlock failure, real-time operation data of the production equipment to perform prediction; predicting, by the model for predicting safety interlock failure, whether the safety interlock device fails according to fault shutdown alarm information and non-fault shield alarm information in the real-time operation data, and generating a prediction result; and if the prediction result indicates that the safety interlock device fails, generating early warning information, wherein the fault shutdown alarm information is alarm information generated when the safety shield is opened to shut down the production equipment, and the non-fault shield alarm information is alarm information generated when the safety shield is opened or closed after the production equipment is shut down.

6 Claims, 4 Drawing Sheets

(56) References Cited

FOREIGN PATENT DOCUMENTS

| CN | 209928590 | U | * | 1/2020 |
|----|-----------|---|---|--------|
| CN | 111768022 | A |   | 10/2020 |
| CN | 112085275 | A |   | 12/2020 |

* cited by examiner

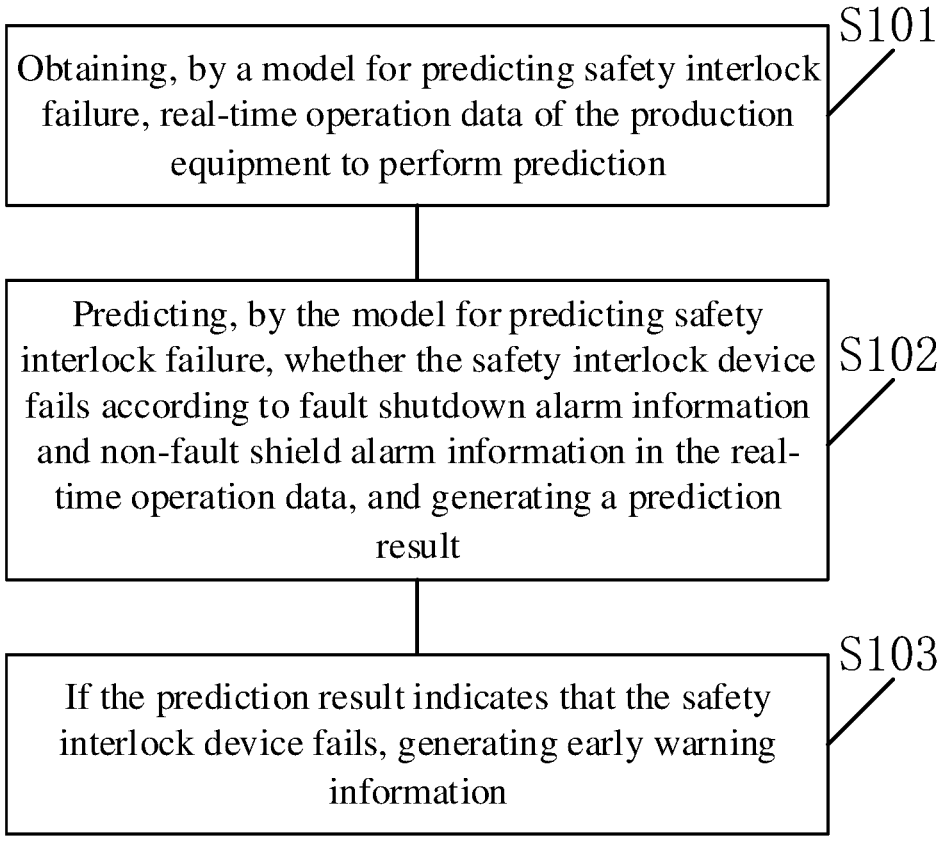

Obtaining, by a model for predicting safety interlock failure, real-time operation data of the production equipment to perform prediction — S101

Predicting, by the model for predicting safety interlock failure, whether the safety interlock device fails according to fault shutdown alarm information and non-fault shield alarm information in the real-time operation data, and generating a prediction result — S102

If the prediction result indicates that the safety interlock device fails, generating early warning information — S103

FIG. 1

SAFETY INTERLOCK FAILURE PREDICTION METHOD AND ROLL PRODUCTION SYSTEM

STATEMENT REGARDING PRIOR DISCLOSURES BY AN INVENTOR OR JOINT INVENTOR

This invention was described in the Chinese Patent Application No. 202110268730.X filed on Mar. 12, 2021 and published on Jul. 23, 2021, which shall not be prior art to claimed invention.

FIELD OF TECHNOLOGY

Embodiments of the present disclosure relate to the technical field of safety production, in particular to a method for predicting safety interlock failure and a system for producing a roll package.

BACKGROUND

There are safety shields and safety interlock devices in field equipment for roll packages. Under normal circumstances, during the operation of the equipment, the opening of the safety shields will trigger the action of the safety interlock devices, and then the statuses of signals input to electrical control systems of the field equipment for the roll packages are changed, so that the field equipment for the roll packages will be shut down immediately and may be restarted until the safety shields are closed and reset again. Generally, whether the safety interlock device of a packaging unit fails is judged by adopting operator-based point inspection and safety personnel-based routing inspection, which is a basic means based on "personnel protection" and "physical protection". This basic means will cause that the safety interlock device has actually failed but has not been inspected, resulting in potential safety problems.

SUMMARY

In view of this, one of technical problems solved by embodiments of the present disclosure is to provide a method for predicting safety interlock failure and a system for producing a roll package, so as to overcome or alleviate the above defects in the prior art.

In a first aspect, an embodiment of the present disclosure provides a method for predicting safety interlock failure, which is applied to the real-time prediction of whether a safety interlock device fails, wherein the safety interlock device is applied to production equipment configured with a safety shield, and the method for predicting safety interlock failure includes:

obtaining, by a model for predicting safety interlock failure, real-time operation data of the production equipment to perform prediction;

predicting, by the model for predicting safety interlock failure, whether the safety interlock device fails according to fault shutdown alarm information and non-fault shield alarm information in the real-time operation data, and generating a prediction result; and if the prediction result indicates that the safety interlock device fails, generating early warning information, wherein the fault shutdown alarm information is alarm information generated when the safety shield is opened to shut down the production equipment, and the non-fault shield alarm information is alarm information generated when the safety shield is opened or closed after the production equipment is shut down.

Optionally, in an embodiment of the present disclosure, the method for predicting safety interlock failure further includes: performing failure monitoring on a target position of the production equipment, and generating, if it is monitored that the target position has a fault, a prompt of opening the safety shield.

Optionally, in an embodiment of the present disclosure, the fault of the target position includes at least one of clogging of a first lifter, clogging of a second lifter, loss of CV strip cellophane, exhausting or missing of the CV cellophane, exhausting of a CV drawstring, clogging of an upper CT folder, and unfolding clogging of the CV cellophane.

Optionally, in an embodiment of the present disclosure, before obtaining, by the model for predicting safety interlock failure, the operation data of the production equipment, the method includes:

obtaining historical operation data of the production equipment; and training, based on fault shutdown alarm information and non-fault shield alarm information in the historical operation data, the model for predicting safety interlock failure, wherein the fault shutdown alarm information is alarm information that the total number of times of shutdown of the production equipment exceeds 3 as a target position has a fault within a preset monitoring period.

Optionally, in an embodiment of the present disclosure, after obtaining, by the model for predicting safety interlock failure, the real-time operation data of the production equipment, and before predicting, by the model for predicting safety interlock failure, whether the safety interlock device fails according to the fault shutdown alarm information and the non-fault shield alarm information in the real-time operation data, and generating a prediction result, the method includes:

acquiring, by a data acquisition device, the fault shutdown alarm information and the non-fault shield alarm information in the real-time operation data.

Optionally, in an embodiment of the present disclosure, the acquiring, by the data acquisition device, the fault shutdown alarm information and the non-fault shield alarm information in the real-time operation data, includes: identifying, by the data acquisition device, the type of the real-time operation data to acquire the fault shutdown alarm information and the non-fault shield alarm information in the real-time operation data.

Optionally, in an embodiment of the present disclosure, the identifying, by the data acquisition device, the type of the real-time operation data to acquire the fault shutdown alarm information and the non-fault shield alarm information in the real-time operation data, includes: identifying, by the data acquisition device, the type of the real-time operation data to determine an alarm information queue, wherein the alarm information queue comprises the fault shutdown alarm information and the non-fault shield alarm information, the fault shutdown alarm information is located in the head of the alarm information queue, and the non-fault shield alarm message is located after the fault shutdown alarm information.

Optionally, in an embodiment of the present disclosure, the identifying, by the data acquisition device, the type of the real-time operation data to determine the alarm information queue, includes: identifying, by the data acquisition device, the type of the real-time operation data to monitor whether alarm information is generated, and establishing an alarm information list; generating the alarm information queue according to the alarm information list; and clearing the alarm information queue when the production equipment changes from shutdown to operation, alternatively, inserting the monitored alarm information into the alarm information list when the production equipment changes from operation to shutdown.

In a second aspect, an embodiment of the present disclosure provides a system for producing a roll package, including a device for producing the roll package, and a safety shield configured for the device for producing the roll package, wherein a safety interlock device is triggered to work when the safety shield is opened, the safety interlock device enables the device for producing the roll package to be shut down, and whether the safety interlock device fails is predicted by the method for predicting safety interlock failure according to any one of the embodiments of the present disclosure.

In the technical solutions in the embodiments of the present disclosure, the real-time operation data of the production equipment is obtained by the model for predicting safety interlock failure to perform prediction; the model for predicting safety interlock failure predicts, according to the fault shutdown alarm information and the non-fault shield alarm information in the real-time operation data, whether the safety interlock device fails, and generates the prediction result; and if the prediction result indicates that the safety interlock device fails, the early warning information is generated, wherein the fault shutdown alarm information is the alarm information generated when the safety shield is opened to shut down the production equipment, and the non-fault shield alarm information is the alarm information generated when the safety shield is opened or closed after the production equipment is shut down. Therefore, the problem that a safety interlock device has actually failed but has not been inspected manually in the prior art is solved, or in other words, whether the safety interlock device fails may be accurately judged, thereby ensuring the safety of production.

BRIEF DESCRIPTION OF THE DRAWINGS

Hereinafter, some specific embodiments in the embodiments of the present disclosure will be described in detail by an exemplary and nonrestrictive way with reference to the accompanying drawings. The same drawing symbols in the accompanying drawings designate the same or similar components or parts. It will be understood by those skilled in the art that these accompanying drawings are not necessarily drawn to scale. In the accompanying drawings:

FIG. 1 is a flowchart of a method for predicting safety interlock failure according to an embodiment of the present disclosure;

DETAILED DESCRIPTION OF THE EMBODIMENTS

Figure 2:
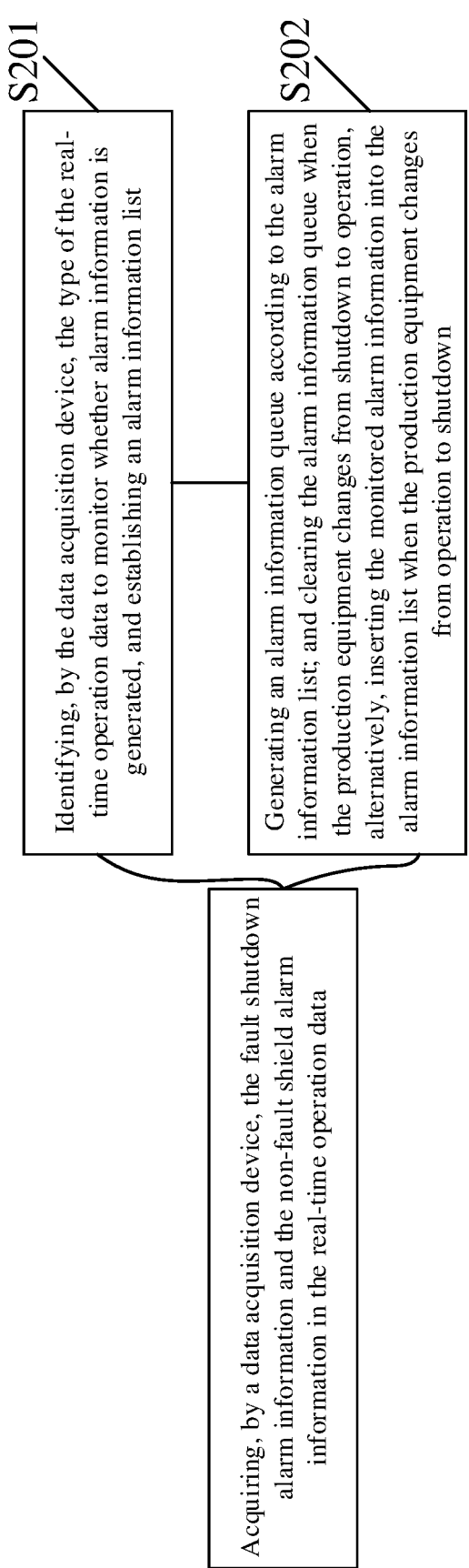
FIG. 2 is a flowchart of a method for acquiring data according to an embodiment of the present disclosure.

Implementing any one of the technical solutions in the embodiments of the present disclosure does not necessarily need to achieve all the above advantages at the same time.

In order to make those skilled in the art better understand the technical solutions in the embodiments of the present disclosure, the following will clearly and completely describe the technical solutions in the embodiments of the present disclosure with reference to the accompanying drawings in the embodiments of the present disclosure. Apparently, the described embodiments are only a part rather than all of the embodiments of the present disclosure. All other embodiments derived by those of ordinary skill in the art based on the embodiments in the embodiments of the present disclosure shall fall within the scope of protection of the embodiments of the present disclosure.

The specific implementation of the embodiments of the present disclosure is further described below with reference to the accompanying drawings of the embodiments of the present disclosure.

FIG. 1 is a flowchart of a method for predicting safety interlock failure according to an embodiment of the present disclosure. The method for predicting safety interlock failure is applied to the real-time prediction of whether a safety interlock device fails, and the safety interlock device is applied to production equipment configured with a safety shield.

As shown in FIG. 1, the method for predicting safety interlock failure includes:

S101: real-time operation data of the production equipment is obtained by a model for predicting safety interlock failure to perform prediction;

S102: the model for predicting safety interlock failure predicts, according to fault shutdown alarm information and non-fault shield alarm information in the real-time operation data, whether the safety interlock device fails, and generates a prediction result; and S103: if the prediction result indicates that the safety interlock device fails, early warning information is generated.

Specifically, in this embodiment, the fault shutdown alarm information is alarm information generated when the production equipment is shut down within a scope of protection of the safety shield, and the non-fault shield alarm information is alarm information generated when the safety shield is opened or closed after the production equipment is shut down. Otherwise, the early warning information is not generated.

Optionally, in an embodiment of the present disclosure, the method for predicting safety interlock failure further includes: failure monitoring is performed on a target position of the production equipment, and if it is monitored that the target position has a fault, a prompt of opening the safety shield is generated.

Optionally, in an embodiment of the present disclosure, the fault of the target position includes at least one of clogging of a first lifter, clogging of a second lifter, loss of CV strip cellophane, exhausting or missing of the CV cellophane, exhausting of a CV drawstring, clogging of an upper CT folder, and unfolding clogging of the CV cellophane. CT stands for carton packaging machine, and CV stands for carton transparent paper packaging machine.

In this embodiment, the model for predicting safety interlock failure is obtained by training a selected prediction model by using sample alarm information, wherein the prediction model may be determined according to an application scenario. Specifically, the model for predicting safety interlock failure may be obtained by training the selected prediction model through a non-linear support vector machine (Non-Linear SVM).

In this embodiment, during the production of the production equipment, for example, when fault handling needs to be performed, the safety shield must be opened or closed. For this, in this embodiment, for the above fault shutdown alarm information generated during the fault handling and the non-fault shield alarm information generated when the safety shield is opened, based on the assumption of this application scenario, the above prediction model is accurately and comprehensively trained to obtain an accurate model for predicting safety interlock failure, so as to accurately predict whether the safety interlock device fails.

Further, in this embodiment, in order to ensure the safety of data, the above fault shutdown alarm information and non-fault shield alarm information may be stored on a database server, and the model for predicting safety interlock failure obtains the above fault shutdown alarm information and non-fault shield alarm information from the database server through an encrypted data channel.

FIG. 2 is a flowchart of a method for acquiring data according to an embodiment of the present disclosure. After the model for predicting safety interlock failure obtains the real-time operation data of the production equipment, and before the model for predicting safety interlock failure predicts, according to the fault shutdown alarm information and the non-fault shield alarm information in the real-time operation data, whether the safety interlock device fails, and generates the prediction result, the method for acquiring the data is performed, which includes: a data acquisition device acquires the fault shutdown alarm information and the non-fault shield alarm information in the real-time operation data.

Optionally, in an embodiment of the present disclosure, the process that the data acquisition device acquires the fault shutdown alarm information and the non-fault shield alarm information in the real-time operation data, includes: the data acquisition device identifies the type of the real-time operation data to acquire the fault shutdown alarm information and the non-fault shield alarm information in the real-time operation data.

Optionally, in an embodiment of the present disclosure, the real-time operation data includes four-dimensional feature data consisting of the number of times of red information, an output of the equipment, related elimination quantities, and related shutdown reasons. The data acquisition device identifies the type of the real-time operation data by adopting a recursive feature elimination method in wrapper feature selection to acquire the fault shutdown alarm information and the non-fault shield alarm information in the real-time operation data, thereby improving the accuracy of data identification.

Optionally, in an embodiment of the present disclosure, based on the linear SVM and a logistic regression as a base classifier and a step size of 1, the data acquisition device identifies the type of the real-time operation data by adopting a recursive feature elimination method in wrapper feature selection to acquire the fault shutdown alarm information and the non-fault shield alarm information in the real-time operation data, thereby improving the efficiency and accuracy of data identification.

Optionally, in an embodiment of the present disclosure, the process that the data acquisition device identifies the type of the real-time operation data to acquire the fault shutdown alarm information and the non-fault shield alarm information in the real-time operation data, includes: the data acquisition device identifies the type of the real-time operation data to determine an alarm information queue, wherein the alarm information queue includes the fault shutdown alarm information and the non-fault shield alarm information, the fault shutdown alarm information is located in the head of the alarm information queue, and the non-fault shield alarm message is located after the fault shutdown alarm information.

Optionally, in an embodiment of the present disclosure, the process that the data acquisition device identifies the type of the real-time operation data to determine the alarm information queue, includes:

S201: the data acquisition device identifies the type of the real-time operation data to monitor whether alarm information is generated, and establishes an alarm information list; and S202: the alarm information queue is generated according to the alarm information list; and the alarm information queue is cleared when the production equipment changes from shutdown to operation, alternatively, the monitored alarm information is inserted into the alarm information list when the production equipment changes from operation to shutdown.

Figure 3:
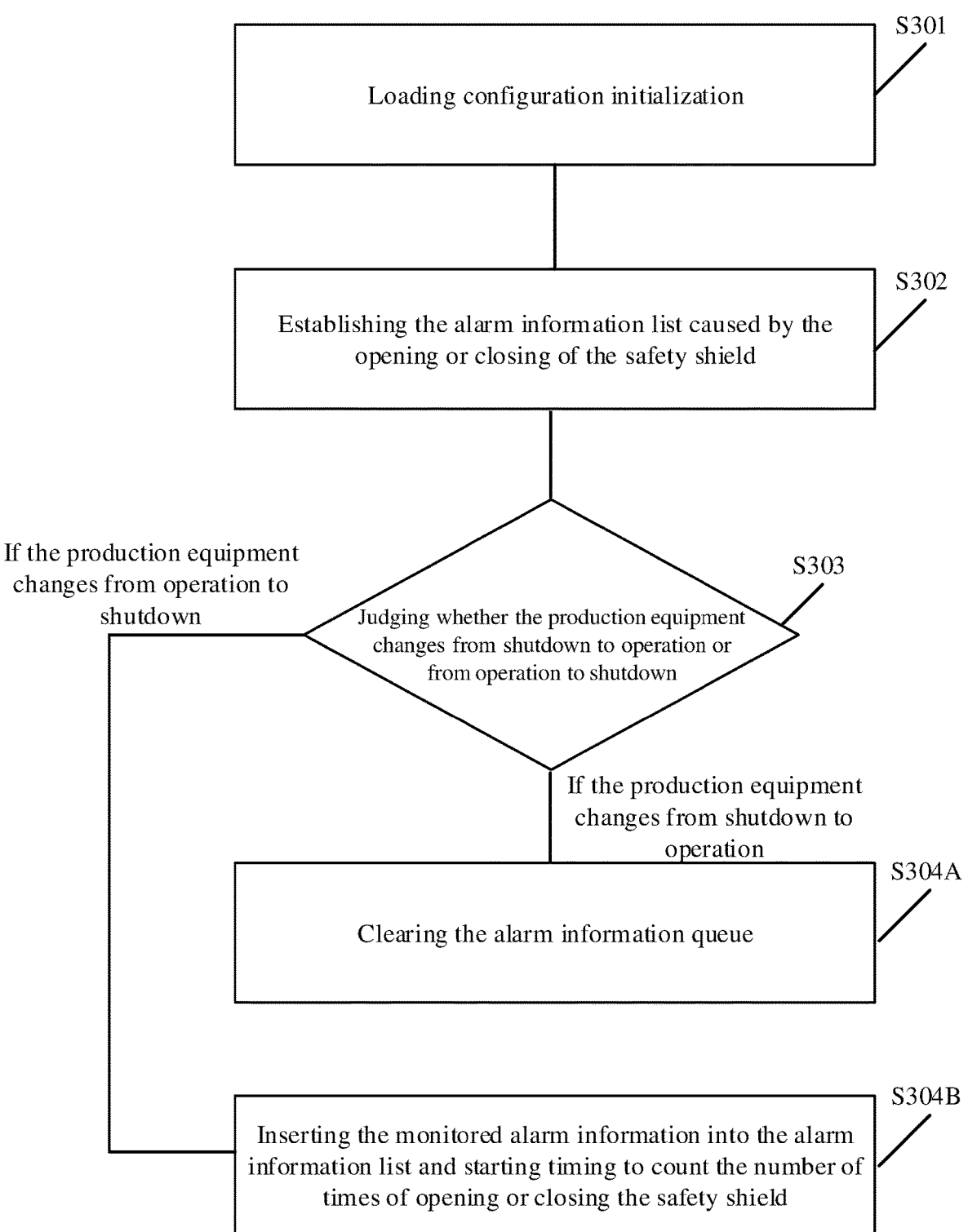
FIG. 3 is a flowchart of a method for acquiring data according to an embodiment of the present disclosure.

FIG. 3 is a flowchart of a method for acquiring data according to an embodiment of the present disclosure. As shown in FIG. 3, this embodiment includes:

S301: configuration initialization is loaded;

S302: the alarm information list caused by the opening or closing of the safety shield is established;

S303: whether the production equipment changes from shutdown to operation or from operation to shutdown is judged;

S304A: if the production equipment changes from shutdown to operation, the alarm information queue is cleared; and S304B: if the production equipment changes from operation to shutdown, the monitored alarm information is inserted into the alarm information list and timing is started to count the number of times of opening or closing the safety shield.

Figure 4:
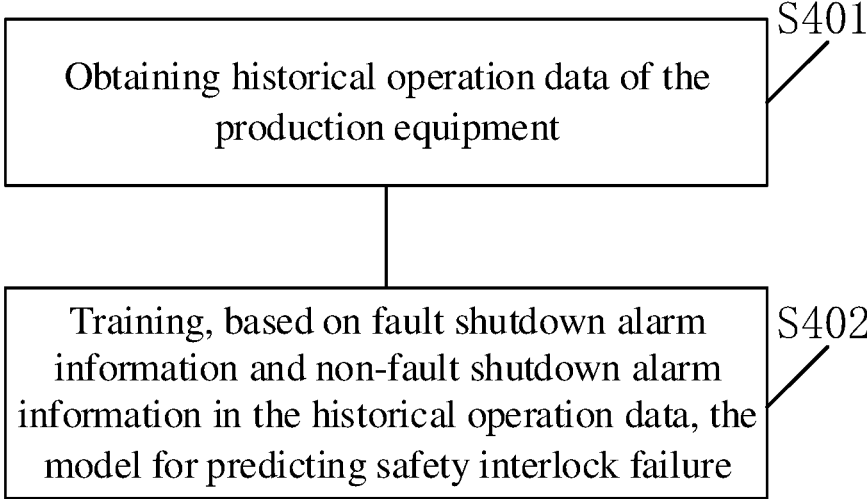
FIG. 4 is a training method of a model for predicting safety interlock failure according to an embodiment of the present disclosure.

FIG. 4 is a training method of a model for predicting safety interlock failure according to an embodiment of the present disclosure. As shown in FIG. 4, the model for predicting safety interlock failure is trained before obtaining the operation data of the production equipment. Specifically, the training method includes:

S401: historical operation data of the production equipment is obtained; and

S402: based on fault shutdown alarm information and non-fault shutdown alarm information in the historical operation data, the model for predicting safety interlock failure is trained, wherein the fault shutdown alarm information is alarm information that the total number of times of shutdown of the production equipment exceeds 3 as a target position has a fault within a preset monitoring period. Thus the production equipment screens out the data with less opening or closing information of the safety shield in a stable operation process, which makes it difficult to accurately judge a safety interlock failure state of the shield, thereby ensuring that whether the safety interlock device fails may be accurately predicted. As described above, the fault of the target position includes at least one of clogging of a first lifter, clogging of a second lifter, loss of CV strip cellophane, exhausting or missing of the CV cellophane, exhausting of a CV drawstring, clogging of an upper CT folder, and unfolding clogging of the CV cellophane.

Optionally, in an embodiment of the present disclosure, the fault shutdown alarm information and the non-fault shutdown alarm information in the historical operation data form a data set, and the data set is randomly divided into a training set and a test set according to a ratio of 8:2, wherein the training set is used to train the model for predicting safety interlock failure, and the test set is used to test whether the model for predicting safety interlock failure is accurate, thereby improving the generalization effect.

Optionally, in an embodiment of the present disclosure, the model for predicting safety interlock failure is as follows:

The model for predicting safety interlock failure is as follows:

$$f(x) = \text{sign}\left( \sum_{i=1}^{N} \alpha_i^* y_i K(x, x_i) + b^* \right),$$

wherein $\alpha^*$ represents a first training parameter vector (for example, specifically a Lagrangian multiplier vector), $b^*$ represents a second training parameter vector, $x_i$ represents a two-dimensional feature vector formed by the fault shutdown alarm information and the non-fault shield alarm information, $y_i$ represents that a value $\pm 1$ is taken for a training label of $x_i$, $K(x, x_i)$ represents a training kernel that is a nonlinear Gaussian kernel, and sign represents a sign function. If the safety interlock device fails, the value of the sign function is 1, otherwise, the value of the sign function is $-1$, so that two-dimensional features are mapped to a higher-dimensional space. A hyperplane is found for classification, so that a nonlinear problem is transformed into a linear problem to be solved, and optimal first and second training parameter vectors are obtained. In addition, due to the addition of training labels that reflect the understanding of the degree of safety interlock failure, different training labels may achieve different inputs at a training phase. Therefore, in practical applications, an inspection feedback situation and a predicted situation are compared in time to optimize parameters of the model and improve the accuracy of the training model.

Further, during the training, the following constraints are satisfied to obtain the optimal first and second training parameter vectors and improve the accuracy of model training:

$$\sum_{i=1}^{N} \alpha_i y_i = 0$$

$$0 \leq \alpha_i \leq C, i = 1, 2, \dots, N, C \text{ is a penalty coefficient.}$$

In a second aspect, an embodiment of the present disclosure provides a system for producing a roll package, including a device for producing the roll package, and a safety shield configured for the device for producing the roll package, wherein a safety interlock device is triggered to work when the safety shield is opened, the safety interlock device enables the device for producing the roll package to be shut down, and whether the safety interlock device fails is predicted by the method for predicting safety interlock failure according to any one of the embodiments of the present disclosure.

Thus, the specific embodiments of the present disclosure have been described. Other embodiments are within the scope of the appended claims. In some cases, the actions recorded in the claims may be performed in different sequences and may still achieve desirable results. In addition, the processes depicted in the accompanying drawings do not necessarily require the shown particular or continuous sequence to achieve desirable results. In certain embodiments, multitasking and parallel processing may be advantageous.

It should also be noted that the term "include", "contain" or any other variation thereof is intended to cover a non-exclusive inclusion, so that a process, method, commodity or apparatus including a series of elements includes not only those elements, but also other elements not expressly listed, or further includes elements inherent to such process, method, commodity or apparatus. Without further limitation, an element limited by a statement "including a . . . " does not preclude the presence of additional identical elements in the process, method, commodity or The above are only the embodiments of the present disclosure and are not intended to limit the present disclosure. For those skilled in the art, the present disclosure may have various modifications and changes. Any modifications, equivalent substitutions, improvements and the like made within the spirit and principle of the present disclosure should be included within the scope of the claims of the present disclosure.

What is claimed is:

1. A method for predicting safety interlock failure, which is applied to the real-time prediction of whether a safety interlock device fails, wherein the safety interlock device is applied to production equipment configured with a safety shield, and the method for predicting safety interlock failure comprises:

obtaining, by a model for predicting safety interlock failure, real-time operation data of the production equipment to perform prediction;

predicting, by the model for predicting safety interlock failure, whether the safety interlock device fails according to fault shutdown alarm information and non-fault shield alarm information in the real-time operation data, and generating a prediction result; and if the prediction result indicates that the safety interlock device fails, generating early warning information, wherein the fault shutdown alarm information is alarm information generated when the production equipment is shut down within a scope of protection of the safety shield, and the non-fault shield alarm information is alarm information generated when the safety shield is opened or closed after the production equipment is shut down;

wherein, before obtaining, by the model for predicting safety interlock failure, the real-time operation data of the production equipment comprising:

obtaining historical operation data of the production equipment; and training, based on fault shutdown alarm information and non-fault shield alarm information in the historical operation data, the model for predicting safety interlock failure, wherein the fault shutdown alarm information is alarm information that the total number of times of shutdown of the production equipment exceeds 3 as a target position has a fault within a preset monitoring period.

2. The method for predicting safety interlock failure according to claim 1, wherein after obtaining, by the model for predicting safety interlock failure, the real-time operation data of the production equipment, and before predicting, by the model for predicting safety interlock failure, whether the safety interlock device fails according to the fault shutdown alarm information and the non-fault shield alarm information in the real-time operation data, and generating a prediction result, the method comprises:

acquiring, by a data acquisition device, the fault shutdown alarm information and the non-fault shield alarm information in the real-time operation data.

3. The method for predicting safety interlock failure according to claim 2, wherein the acquiring, by the data acquisition device, the fault shutdown alarm information and the non-fault shield alarm information in the real-time operation data, comprises: identifying, by the data acquisition device, the type of the real-time operation data to acquire the fault shutdown alarm information and the non-fault shield alarm information in the real-time operation data.

4. The method for predicting safety interlock failure according to claim 3, wherein the identifying, by the data acquisition device, the type of the real-time operation data to acquire the fault shutdown alarm information and the non-fault shield alarm information in the real-time operation data, comprises: identifying, by the data acquisition device, the type of the real-time operation data to determine an alarm information queue, wherein the alarm information queue comprises the fault shutdown alarm information and the non-fault shield alarm information, the fault shutdown alarm information is located in the head of the alarm information queue, and the non-fault shield alarm information is located after the fault shutdown alarm information.

5. The method for predicting safety interlock failure according to claim 4, wherein the identifying, by the data acquisition device, the type of the real-time operation data to determine the alarm information queue, comprises:

identifying, by the data acquisition device, the type of the real-time operation data to determine whether or not alarm information is generated, and establishing an alarm information list;

generating the alarm information queue according to the alarm information list; and clearing the alarm information queue when the production equipment changes from shutdown to operation, or, inserting the monitored alarm information into the alarm information list when the production equipment changes from operation to shutdown.

6. A system for producing a roll package, comprising a device for producing the roll package, and a safety shield configured for the device for producing the roll package, wherein a safety interlock device is triggered to work when the safety shield is opened, the safety interlock device enables the device for producing the roll package to be shut down, and whether the safety interlock device fails is predicted by the method for predicting safety interlock failure according to claim 1.

* * * * *